United States Patent
Sugihira et al.

(10) Patent No.: US 9,845,741 B2
(45) Date of Patent: Dec. 19, 2017

(54) ABNORMALITY DETECTION DEVICE FOR ENGINE CONTROL DEVICE AND ABNORMALITY DETECTION METHOD FOR ENGINE CONTROL DEVICE

(71) Applicants: Shigehiro Sugihira, Toyota (JP); Naoto Kato, Toyota (JP); Yoshitaka Ukawa, Toki (JP)

(72) Inventors: Shigehiro Sugihira, Toyota (JP); Naoto Kato, Toyota (JP); Yoshitaka Ukawa, Toki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 145 days.

(21) Appl. No.: 14/435,828

(22) PCT Filed: Jan. 28, 2014

(86) PCT No.: PCT/IB2014/000077
§ 371 (c)(1),
(2) Date: Apr. 15, 2015

(87) PCT Pub. No.: WO2014/118613
PCT Pub. Date: Aug. 7, 2014

(65) Prior Publication Data
US 2015/0285167 A1    Oct. 8, 2015

(30) Foreign Application Priority Data
Jan. 29, 2013    (JP) .................................. 2013-014588

(51) Int. Cl.
*F02D 37/02* (2006.01)
*F02D 41/14* (2006.01)
(Continued)

(52) U.S. Cl.
CPC ......... *F02D 37/02* (2013.01); *F02D 41/1497* (2013.01); *F02D 41/22* (2013.01);
(Continued)

(58) Field of Classification Search
CPC ...... F02D 37/02; F02D 41/1497; F02D 41/22; F02D 41/221; F02D 41/263; F02D 2200/1004; F02D 2250/18; Y02T 10/40
(Continued)

(56) References Cited

U.S. PATENT DOCUMENTS 5,063,901 A * 11/1991 Kaneyasu ............... F02D 37/02
                                                          123/406.13
5,692,472 A    12/1997 Bederna et al.
(Continued)

FOREIGN PATENT DOCUMENTS

| GB | 2 398 396 | 8/2004 |
| JP | 9 112326 | 4/1997 |

(Continued)

OTHER PUBLICATIONS

International Search Report Issued May 21, 2014 in PCT/1614/000077 Filed Jan. 28, 2014.

*Primary Examiner* — Sizo Vilakazi
*Assistant Examiner* — Brian Kirby
(74) *Attorney, Agent, or Firm* — Oblon, McClelland, Maier & Neustadt, L.L.P.

(57) ABSTRACT

An abnormality detection device is mounted on an engine control device that calculates a target load factor by using a target torque, converts the target load factor to a target throttle opening, calculates a target ignition timing by using a target efficiency, and controls an engine based on the target throttle opening and the target ignition timing. In the abnormality detection device, a target efficiency for monitoring is calculated by using the target ignition timing, a target torque (Continued)

for monitoring is calculated by using the target efficiency for monitoring and the target load factor, a torque deviation between the target torque for monitoring and the target torque is calculated, and the presence or absence of an abnormality is detected by using the torque deviation.

12 Claims, 11 Drawing Sheets

(51) Int. Cl.
    *F02D 41/22*     (2006.01)
    *F02D 41/26*     (2006.01)

(52) U.S. Cl.
    CPC ......... *F02D 41/221* (2013.01); *F02D 41/263* (2013.01); *F02D 2200/1004* (2013.01); *F02D 2250/18* (2013.01); *Y02T 10/40* (2013.01)

(58) Field of Classification Search
    USPC ............ 123/406.11, 406.13, 406.16, 406.12; 701/101, 104, 105, 107, 111, 114, 115, 701/102–103, 54, 29.1, 29.2
    See application file for complete search history.

(56) References Cited

U.S. PATENT DOCUMENTS

| | | | | |
|---|---|---|---|---|
| 5,936,312 | A | * | 8/1999 | Koide ................. B60K 6/26 290/38 R |
| 5,992,379 | A | * | 11/1999 | Brudigam ............ F02D 37/02 123/339.1 |
| 6,247,445 | B1 | | 6/2001 | Langer |
| 6,332,452 | B1 | * | 12/2001 | Debusmann .......... F02D 11/107 123/350 |
| 8,412,395 | B2 | * | 4/2013 | Sano .................... B60L 3/0084 701/22 |
| 2005/0000276 | A1 | | 1/2005 | Bauer et al. |
| 2005/0222724 | A1 | * | 10/2005 | Isono ................. F02D 41/1401 701/36 |
| 2006/0080020 | A1 | * | 4/2006 | Iriyama ................ B60W 30/19 701/54 |
| 2008/0134668 | A1 | * | 6/2008 | Kraemer ............... F02D 35/028 60/277 |
| 2009/0125212 | A1 | * | 5/2009 | Kurashima ............ F02D 37/02 701/103 |
| 2010/0004829 | A1 | | 1/2010 | Tanaka et al. |
| 2010/0211287 | A1 | * | 8/2010 | Ohtsuka ............... F02D 41/263 701/102 |
| 2011/0282561 | A1 | * | 11/2011 | Mitani .................... F02D 9/02 701/102 |
| 2013/0127387 | A1 | * | 5/2013 | Ruland ............... F02D 41/1497 318/432 |
| 2015/0285167 | A1 | * | 10/2015 | Sugihira ............. F02D 41/1497 123/406.12 |

FOREIGN PATENT DOCUMENTS

| | | | | |
|---|---|---|---|---|
| JP | 2001 500222 | | 1/2001 | |
| JP | 2005 520087 | | 7/2005 | |
| JP | 2008 64001 | | 3/2008 | |
| JP | 2009 162199 | | 7/2009 | |
| JP | 2010 190196 | | 9/2010 | |
| JP | 2010190196 | * | 9/2010 | |
| JP | 2010190196 A | * | 9/2010 | |
| JP | 2014145310 A | * | 8/2014 | ......... F02D 41/1497 |

* cited by examiner

ABNORMALITY DETECTION DEVICE FOR ENGINE CONTROL DEVICE AND ABNORMALITY DETECTION METHOD FOR ENGINE CONTROL DEVICE

BACKGROUND OF THE INVENTION

1. Field of the Invention

The invention relates to an abnormality detection device and an abnormality detection method that detect the abnormality of an engine control device mounted on a vehicle. Specifically, the invention relates to an abnormality detection device and an abnormality detection method that detect the abnormality in which a torque more excessive than a torque intended to be output by a driver is output.

2. Description of Related Art

FIG. 1 of Japanese Patent Application Publication No. 2010-190196 (JP 2010-190196 A) discloses an engine control device that performs torque control of an engine. In this engine control device, an increased air amount (corresponds to a target load factor) is calculated from a target torque and a target efficiency using operation elements 341 and 343, the conversion from the increased air amount to a throttle opening is performed, and the control amount of the throttle opening is thereby set. In addition, in this engine control device, the target ignition timing of the engine is calculated from the target efficiency, and the ignition timing of the engine is thereby controlled.

In the engine control device of JP 2010-190196 A, in order to monitor whether or not the torque more excessive than the torque intended to be generated by a driver is generated, it is necessary to monitor whether or not the operation elements 341 and 343 normally operate. That is, it is necessary to monitor whether or not three values of the target torque, the target efficiency, and the increased air amount (the target load factor) are in the normal relationship.

As a technology for performing this monitoring, there is proposed a method in which a target torque for monitoring is calculated by using the target efficiency and the increased air amount, a torque deviation between the target torque for monitoring and the target torque is determined, a count number is incremented when the torque deviation exceeds a threshold value, and it is determined that an abnormality is present, i.e., the torque more excessive than the torque intended to be generated by the driver is generated when the count number exceeds a threshold value (this technology is referred to as a proposed technology).

In the engine control device of JP 2010-190196 A, when the target efficiency is unusually decreased from one times its normal value to 0.1 times the normal value, the increased air amount is increased, the control amount of the throttle opening is increased, and the excessive torque is output. The target ignition timing is retarded in order to prevent the excessive torque. On the other hand, the retard angle limit of the target ignition timing is typically set to a misfire limit (e.g., −20°). Consequently, the target ignition timing cannot be retarded to the retard angle (e.g., −40°) for preventing the excessive torque. As a result, the excessive torque is output.

SUMMARY OF THE INVENTION

In a case where the excessive torque is output, the target torque for monitoring is calculated by using the target efficiency and the increased air amount in the proposed technology described above. In the calculation, a decrease in the target efficiency and an increase in the increased air amount cancel each other. Accordingly, there are cases where the target torque for monitoring matches the target torque, the torque deviation does not exceed the threshold value, and it is not determined that the abnormality is present. That is, there are cases where the abnormality cannot be detected.

The invention provides an abnormality detection device and an abnormality detection method capable of detecting the abnormality in which the target efficiency is unusually decreased and the torque more excessive than the torque intended to be output by the driver is output.

An abnormality detection device for an engine control device in a first aspect of the invention is an abnormality detection device for an engine control device configured to calculate a first target torque, the engine control device being configured to calculate a first target efficiency, the engine control device being configured to calculate a target load factor by using the first target torque, the engine control device being configured to convert the target load factor to a target throttle opening, the engine control device being configured to calculate a target ignition timing by using the first target efficiency, and the engine control device being configured to control an engine based on the target throttle opening and the target ignition timing, the abnormality detection device including a controller configured to calculate a second target efficiency by using the target ignition timing, the controller being configured to calculate a second target torque by using the second target efficiency and the target load factor, the controller being configured to calculate a torque deviation between the second target torque and the first target torque, the controller being configured to count the number of times the torque deviation exceeds a first threshold value, and the controller being configured to determine that the engine control device has an abnormality when the number of times the torque deviation exceeds the first threshold value exceeds a second threshold value. The second target efficiency means a target efficiency for monitoring. The second target torque means a target torque for monitoring.

According to the above configuration, since the target efficiency for monitoring is calculated by using the target ignition timing, in a case where the target efficiency is unusually decreased, a decrease in the target efficiency for monitoring becomes smaller than a decrease in the target efficiency. A specific example of the above case includes a case where an excessive torque is output. Since the target torque for monitoring is calculated by using the target efficiency for monitoring and the target load factor, the decrease in the target efficiency for monitoring and an increase in the target load factor don't cancel each other sufficiently in the calculation, and the target torque for monitoring becomes sufficiently larger than the target torque. With this, the torque deviation becomes larger than the first threshold value, and it is possible to detect an abnormality in which the target efficiency is unusually decreased and the excessive torque is output.

An abnormality detection device for an engine control device in a second aspect of the invention is an abnormality detection device for an engine control device configured to calculate a first target torque, the engine control device being configured to calculate a first target efficiency, the engine control device being configured to calculate a target load factor by using the first target torque, the engine control device being configured to convert the target load factor to a target throttle opening, the engine control device being configured to calculate a target ignition timing by using the first target-efficiency, and the engine control device being configured to control an engine based on the target throttle opening and the target ignition timing, the abnormality detection device including a controller configured to calculate a third target efficiency by performing gradual change processing on the first target efficiency, the controller being configured to calculate a second target torque by using the third target efficiency and the target load factor, the controller being configured to calculate a torque deviation between the second target torque and the first target torque, the controller being configured to count the number of times the torque deviation exceeds a first threshold value, and the controller being configured to determine that the engine control device has an abnormality when the number of times the torque deviation exceeds the first threshold value exceeds a second threshold value. The third target efficiency corresponds to a post-gradual change target efficiency. The second target torque corresponds to the target torque for monitoring.

According to the above configuration, since the post-gradual change target efficiency is calculated by performing the gradual change processing on the target efficiency, and the target torque for monitoring is calculated by using the post-gradual change target efficiency and the target load factor, in the case where the target efficiency is unusually decreased, a decrease in the post-gradual change target efficiency becomes smaller than the decrease in the target efficiency. Consequently, in the calculation of the target torque for monitoring, the decrease in the post-gradual change target efficiency and the increase in the target load factor don't cancel each other sufficiently, and the target torque for monitoring becomes sufficiently larger than the target torque. With this, the torque deviation becomes larger than the first threshold value, and it is possible to detect the abnormality in which the target efficiency is unusually decreased and the excessive torque is output.

In the above configuration, the controller may calculate the third target efficiency by performing the gradual change processing on the first target efficiency, and the controller may calculate the second target torque by using the larger one of the second target efficiency and the third target efficiency, and the target load factor. The third target efficiency corresponds to the post-gradual change target efficiency.

According to the above configuration, in a series of the processing, since the post-gradual change target efficiency is further calculated by performing the gradual change processing on the target efficiency, and the larger one of the target efficiency for monitoring and the post-gradual change target efficiency is used in the calculation of the target torque for monitoring, the value of the target torque for monitoring is further increased. With this, in the case where the target efficiency is unusually decreased, the torque deviation becomes larger than the first threshold value more reliably, and it is possible to detect the abnormality in which the target efficiency is unusually decreased and the excessive torque is output.

In the above configuration, when the third target efficiency is smaller than the third target efficiency acquired in previous processing, the controller may calculate the third target efficiency by subtracting a predetermined gradual change amount from the third target efficiency acquired in the previous processing.

According to the above configuration, in the case where the target efficiency is unusually decreased, it is possible to make the decrease in the post-gradual change target efficiency smaller than the decrease in the target efficiency more reliably.

An abnormality detection method for an engine control device in a third aspect of the invention is an abnormality detection method for an engine control device configured to calculate a first target torque, the engine control device being configured to calculate a first target efficiency, the engine control device being configured to calculate a target load factor by using the first target torque, the engine control device being configured to convert the target load factor to a target throttle opening, the engine control device being configured to calculate a target ignition timing by using the first target efficiency, and the engine control device being configured to control an engine based on the target throttle opening and the target ignition timing, the abnormality detection method including calculating a second target efficiency by using the target ignition timing, calculating a second target torque by using the second target efficiency and the target load factor, calculating a torque deviation between the second target torque and the first target torque, counting the number of times the torque deviation exceeds a first threshold value, and determining that the engine control device has an abnormality when the number of times the torque deviation exceeds the first threshold value exceeds a second threshold value.

An abnormality detection method for an engine control device in a fourth aspect of the invention is an abnormality detection method for an engine control device configured to calculate a first target torque, the engine control device being configured to calculate a first target efficiency, the engine control device being configured to calculate a target load factor by using the first target torque, the engine control device being configured to convert the target load factor to a target throttle opening, the engine control device being configured to calculate a target ignition timing by using the first target efficiency, and the engine control device being configured to control an engine based on the target throttle opening and the target ignition timing, the abnormality detection method including calculating a third target efficiency by performing gradual change processing on the first target efficiency, calculating a second target torque by using the third target efficiency and the target load factor, calculating a torque deviation between the second target torque and the first target torque, counting the number of times the torque deviation exceeds a first threshold value, and determining that the engine control device has an abnormality when the number of times the torque deviation exceeds the first threshold value exceeds a second threshold value.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
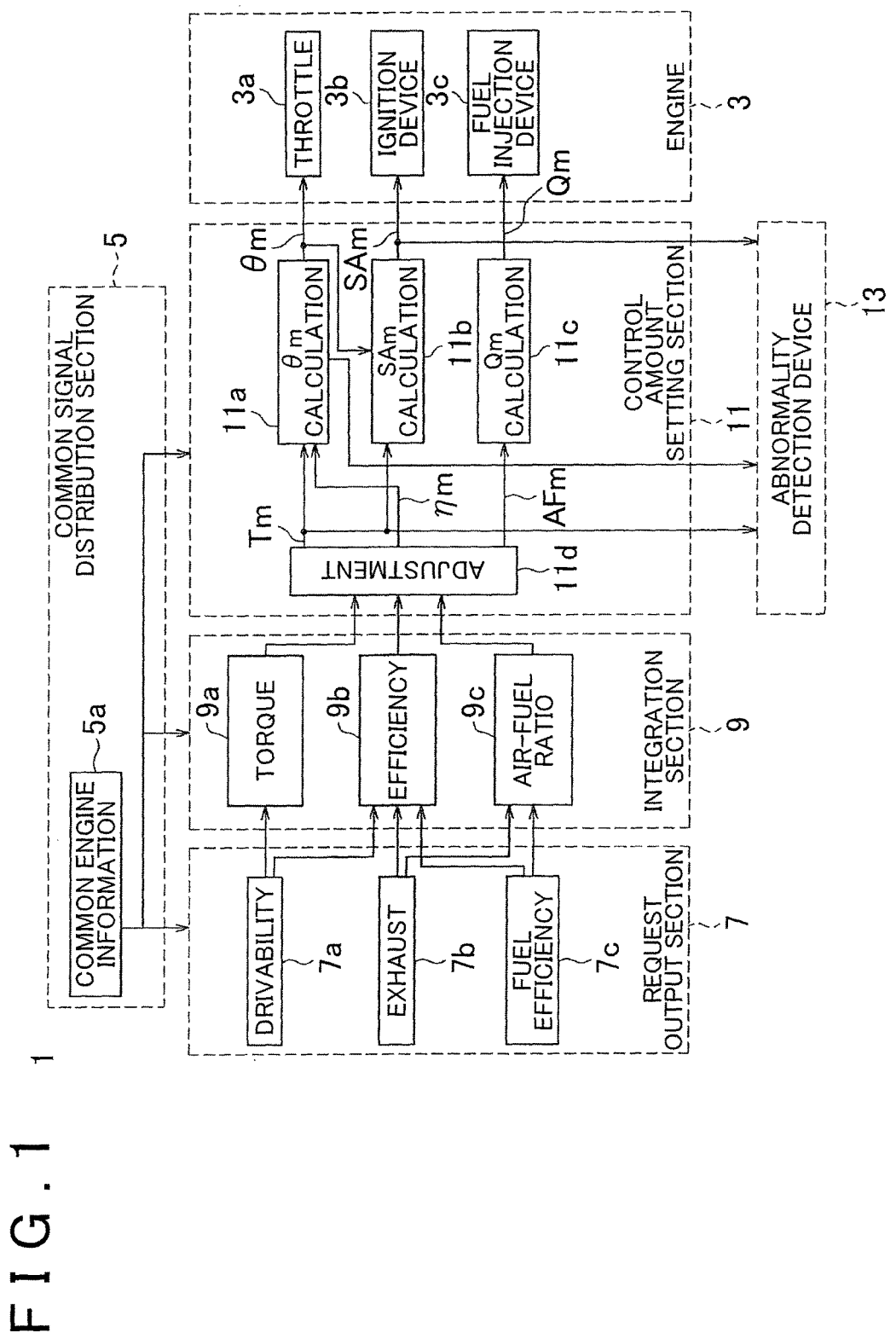
FIG. 1 is a schematic block diagram of an engine control device on which an abnormality detection device according to a first embodiment of the invention is mounted.
Figure 2:
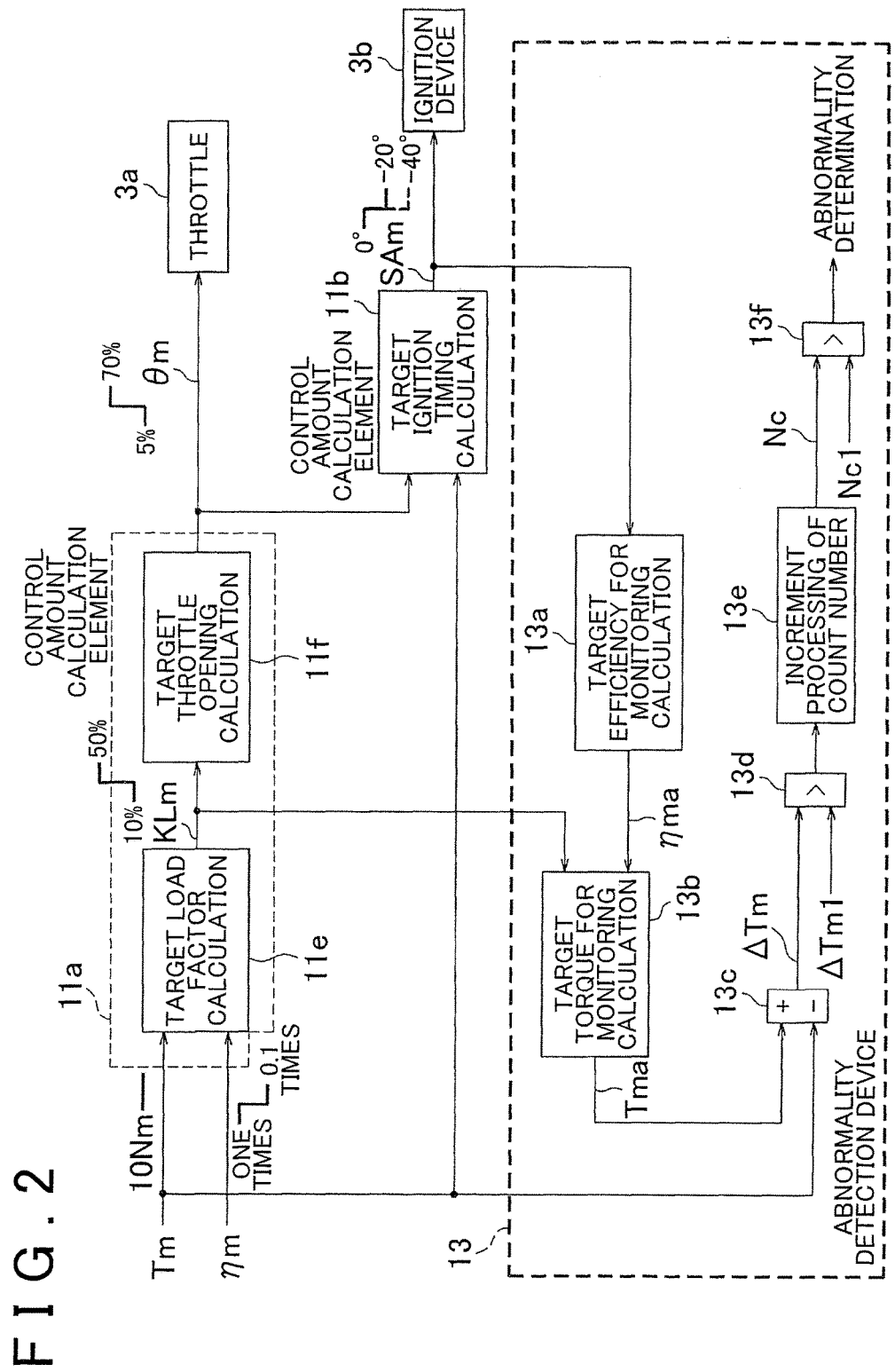
FIG. 2 is an enlarged view of the principal portion of the engine control device of FIG. 1.
Figure 3:
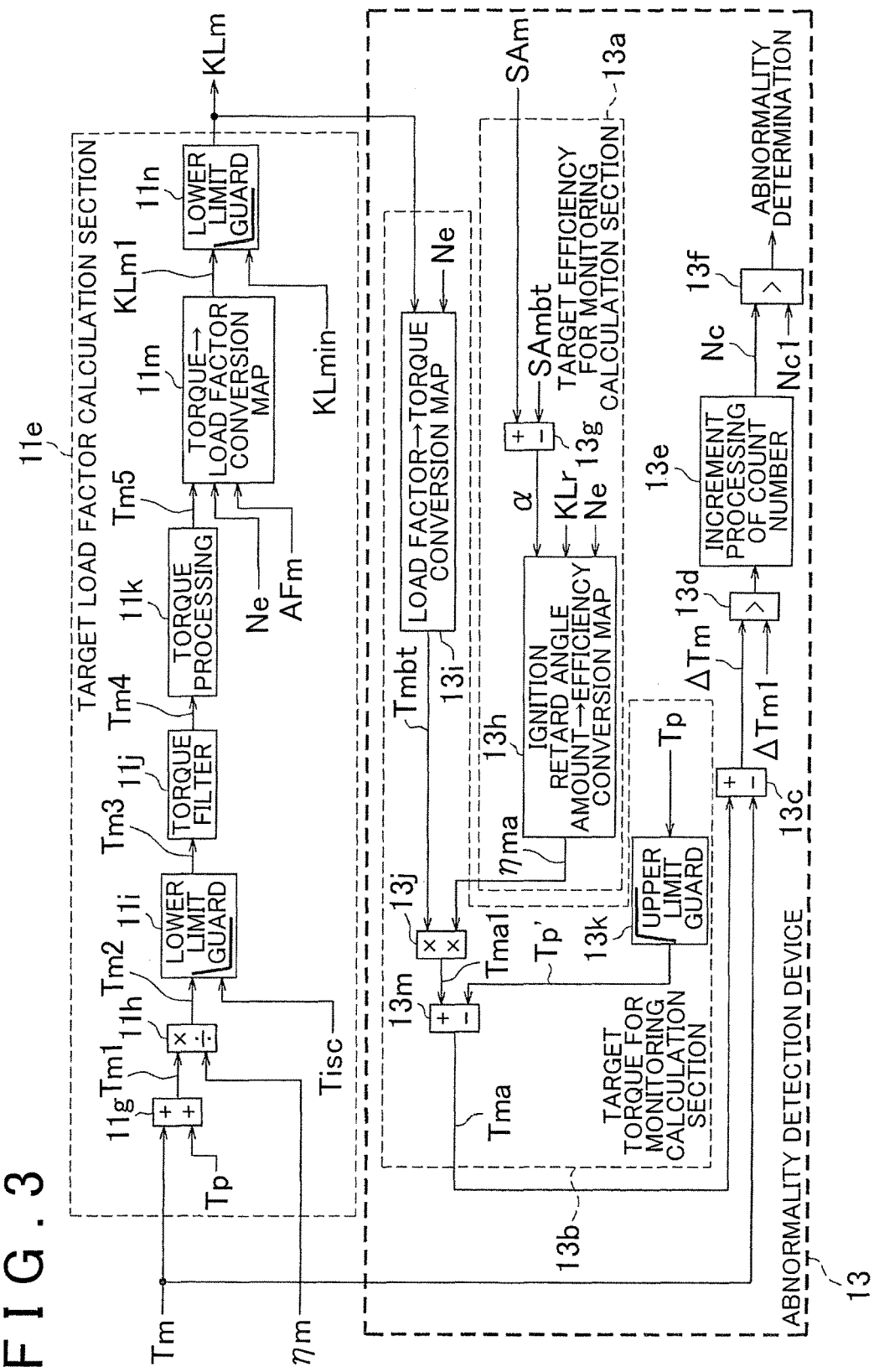
FIG. 3 is a view showing the schematic configuration of each of a target load factor calculation section, a target efficiency for monitoring calculation section, and a target torque for monitoring calculation section of FIG. 2.

Hereinbelow, embodiments of the invention will be described in detail with reference to the accompanying drawings. FIG. 1 is a schematic block diagram of an engine control device on which an abnormality detection device according to a first embodiment of the invention is mounted. FIG. 2 is an enlarged view of the principal portion of the engine control device of FIG. 1. FIG. 3 is a view showing the schematic configuration of each of a target load factor calculation section, a target efficiency for monitoring calculation section, and a target torque for monitoring calculation section of FIG. 2.

As shown in FIG. 1, an abnormality detection device 13 according to the embodiment detects the abnormality of an engine control device 1 that controls an engine 3 mounted on, e.g., a vehicle. Specifically, the abnormality detection device 13 detects the abnormality in which a target efficiency is unusually decreased and a torque more excessive than a torque intended to be output by a driver is output. The abnormality detection device 13 calculates a target efficiency used to monitor the abnormality (hereinafter referred to as a target efficiency for monitoring) ηma by using a target ignition timing SAm. The abnormality detection device 13 also calculates a target torque used to monitor the abnormality (hereinafter referred to as a target torque for monitoring) Tma by using the target efficiency for monitoring ηma and a target load factor KLm. Further, the abnormality detection device 13 calculates a torque deviation ΔTm between the target torque for monitoring Tma and a target torque Tm, and detects the presence or absence of the abnormality by using the torque deviation ΔTm. Hereinbelow, based on FIGS. 1 to 3, the engine control device 1 on which the abnormality detection device 13 is mounted will be described in detail.

As shown in FIG. 1, the engine control device 1 includes a common signal distribution section 5 that distributes information on the operation condition and operation state of the engine 3 (hereinafter referred to as common engine information) 5a, a request output section 7 that quantifies a request related to the function of the engine 3 based on the common engine information 5a and outputs the quantified request, an integration section 9 that integrates various requests output from the request output section 7 into one request value on a per kind basis, a control amount setting section 11 that sets the control amount of each of various actuators 3a, 3b, and 3c used in engine control based on the request value of various requests obtained by the integration section 9, and the abnormality detection device 13 that performs the detection of the abnormality based on processing signals of the control amount setting section 11.

The actuator 3a is a throttle that controls the intake air amount of the engine 3. The actuator 3b is an ignition device of the engine 3. The actuator 3c is a fuel injection device of the engine 3. Hereinafter, they are also referred to as the throttle 3a, the ignition device 3b, and the fuel injection device 3c.

The common signal distribution section 5 acquires the common engine information 5a (a pump loss torque Tp, an idle speed control (ISC) requested torque Tisc, an engine rotational speed Ne, a minimum spark advance for best torque (MBT) ignition timing SAmbt, an actual load factor KLr, and the like) from various sensors provided in the engine 3 (an engine rotational speed sensor and the like) and various calculation sections of the engine control device 1 (a pump loss torque calculation section, an ISC requested torque calculation section, an MBT ignition timing calculation section, an actual load factor calculation section, and the like), and distributes the common engine information 5a to the individual sections (the request output section 7, the integration section 9, and the control amount setting section 11).

Note that the pump loss torque Tp is a torque that is lost by air resistance during the intake operation of the engine 3. The ISC requested torque Tisc is a torque required to obtain a target idle rotation speed. The MBT ignition timing SAmbt is defined as follows. That is, in a case where a vertical axis indicates a torque T and a horizontal axis indicates an ignition timing SA, the torque T output from the engine 3 is represented by an upwardly convex curve shown in FIG. 4. The ignition timing SA at which the torque T is maximized is referred to as the MBT ignition timing SAmbt. Note that the torque (torque at a point A) T at the MBT ignition timing SAmbt is referred to as an MBT torque Tmbt. The actual load factor KLr is the detected value of the load factor, and the load factor is defined as the ratio of an actual intake air amount to the maximum intake air amount per cycle for each cylinder of the engine 3.

The request output section 7 has a plurality of request output elements 7a, 7b, and 7c that output requests related to the individual functions of the engine 3 (e.g., drivability, exhaust, and fuel efficiency). Herein, the request output element 7a outputs the request related to the drivability (drivability request). The request output element 7b outputs the request related to the exhaust (exhaust request). The request output element 7c outputs the request related to the fuel efficiency (fuel efficiency request). Hereinafter, they are also referred to as the drivability request output element 7a, the exhaust request output element 7b, and the fuel efficiency request output element 7c.

Figure 4:
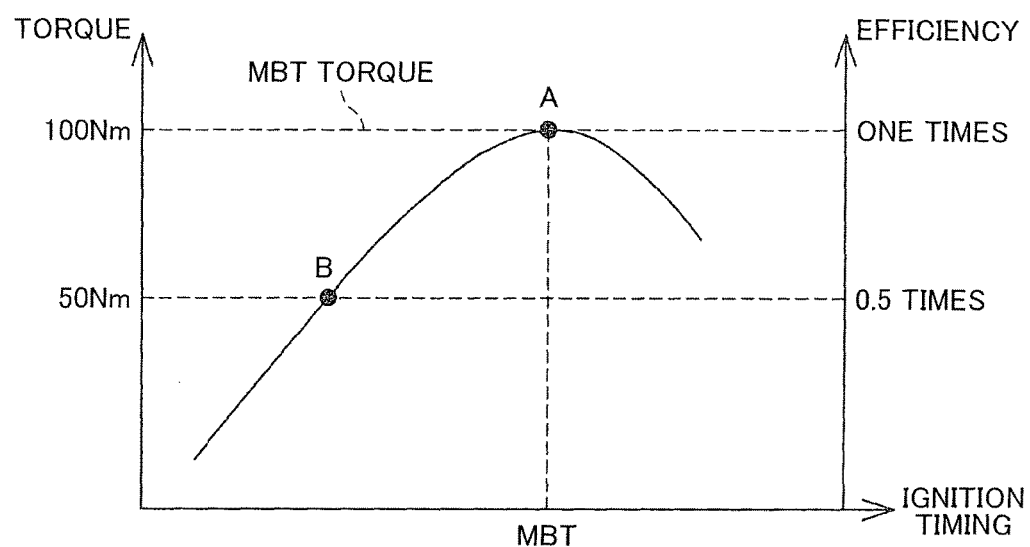
FIG. 4 is a view showing characteristics of the ignition timing and the torque of an engine.

Herein, the output of the engine 3 includes heat and the exhaust in addition to the torque. With all of the torque, heat, and exhaust, various functions of the engine 3 such as the above drivability, exhaust, and fuel efficiency are determined. Therefore, parameters for controlling the output of the engine 3 can come down to three kinds of physical quantities of the torque T, an efficiency η, and an air-fuel ratio AF. By representing the requests related to the various functions of the engine 3 by using the three kinds of the physical quantities to control the operation of each of the various actuators 3a, 3b, and 3c, it is possible to reliably reflect the requests in the output of the engine 3. Accordingly, in this embodiment, the torque T, the efficiency η, and the air-fuel ratio AF are used as the physical quantities used to represent the requests. Note that the efficiency η is defined by the output torque T/the MBT torque Tmbt. For example, the efficiency η at a point B of FIG. 4 is given by 50 Nm/100 Nm=0.5 times.

The drivability request output element 7a outputs the drivability request as, e.g., the request related to the torque T (hereinafter referred to as a torque request) and the request related to the efficiency η (hereinafter referred to as an efficiency request). The exhaust request output element 7b outputs the exhaust request as, e.g., the efficiency request and the request related to the air-fuel ratio AF (hereinafter referred to as an air-fuel ratio request). The fuel efficiency request output element 7c outputs the fuel efficiency request as, e.g., the efficiency request and the air-fuel ratio request.

The integration section 9 has a plurality of integration elements 9a, 9b, and 9c that correspond to the three physical quantities (the torque T, the efficiency η, and the air-fuel ratio AF) used in the requests (the drivability request, the efficiency request, and the air-fuel ratio request). Herein, the integration element 9a corresponding to the torque T (hereinafter also referred to as a torque integration element) collects the respective torque requests from the request output elements 7a, 7b, and 7c, and integrates the collected torque requests into one torque request value according to a predetermined rule. The integration element 9b corresponding to the efficiency η (hereinafter also referred to as an efficiency integration element) collects the respective efficiency requests from the request output elements 7a, 7b, and 7c, and integrates the collected efficiency requests into one efficiency request value according to a predetermined rule. The integration element 9c corresponding to the air-fuel ratio AF (hereinafter also referred to as an air-fuel ratio integration element) collects the respective air-fuel ratio requests from the request output elements 7a, 7b, and 7c, and integrates the collected air-fuel ratio requests into one air-fuel ratio request value according to a predetermined rule. Note that each of the integration elements 9a, 9b, and 9c refers to the common engine information 5a, and performs the integration by a conventional integration method.

The control amount setting section 11 has an adjustment section 11d and a plurality of control amount calculation elements 11a, 11b, and 11c. The adjustment section 11d adjusts the respective request values (the torque request value, the efficiency request value, and the air-fuel ratio request value) from the integration elements 9a, 9b, and 9c such that the appropriate operation of the engine 3 is made possible based on their mutual relationship. Note that the adjustment section 11d refers to the common engine information 5a, and performs the adjustment by a conventional adjustment method. The adjusted request values are also referred to as a target torque Tm, a target efficiency ηm, and a target air-fuel ratio AFm.

The control amount calculation elements 11a, 11b, and 11c calculate the control amounts of the actuators 3a, 3b, and 3c by using the request values adjusted by the adjustment section 11d (the target torque Tm, the target efficiency ηm, and the target air-fuel ratio AFm), and control the actuators 3a, 3b, and 3c based on the calculated control amounts.

Herein, the control amount calculation element 11a calculates the target load factor KLm by using, e.g., the target torque Tm and the target efficiency ηm, converts the calculated target load factor KLm to a target throttle opening θm, and controls the throttle opening of the throttle 3a based on the target throttle opening θm. The control amount calculation element 11b calculates the target ignition timing SAm such that the target torque Tm is achieved by using, e.g., the target torque Tm and the target throttle opening θm, and controls the ignition timing of the ignition device 3b based on the target ignition timing SAm. Note that the retard angle limit (the limit value on a retard angle side) of the target ignition timing SAm is set to, e.g., the misfire limit (the limit value of occurrence of the misfire). Herein, although the retard angle limit of the target ignition timing SAm is set to the misfire limit, the retard angle limit thereof may be set to any value as long as the value allows detection of the abnormality, as described later.

The control amount calculation element 11c calculates a target fuel injection amount Qm by using, e.g., the target air-fuel ratio AFm, and controls the fuel injection amount of the fuel injection device 3c based on the calculated target fuel injection amount Qm.

More specifically, as shown in FIG. 2, the control amount calculation element 11a includes a target load factor calculation section 11e that calculates the target load factor KLm by using the target torque Tm and the target efficiency ηm, and a target throttle opening calculation section 11f that calculates the target throttle opening θm by using the target load factor KLm.

The target load factor calculation section 11e calculates the target load factor KLm such that the target load factor KLm is increased/decreased in accordance with an increase/decrease in the target torque Tm, and the target load factor KLm is increased/decreased in accordance with an increase/decrease in the target efficiency ηm. More specifically, as shown in FIG. 3, the target load factor calculation section 11e includes operation sections 11g and 11h, lower limit guard processing sections 11i and 11n, a torque filter processing section 11j, a torque processing section 11k, and a conversion section 11m.

The operation section 11g adds the pump loss torque Tp from the pump loss torque calculation section to the target torque Tm from the adjustment section 11d, and outputs the addition result (hereinafter referred to as a post-addition target torque) Tm1 to the operation section 11h.

The operation section 11h divides the post-addition target torque Tm1 from the operation section 11g by the target efficiency ηm from the adjustment section 11d, and outputs the division result (hereinafter referred to as a post-division target torque) Tm2 to the lower limit guard processing section 11i.

The lower limit guard processing section 11i performs lower limit guard processing on the post-division target torque Tm2 from the operation section 11h, and outputs the processing result (hereinafter referred to as a post-lower limit guard processing target torque) Tm3 to the torque filter processing section 11j. More specifically, the lower limit guard processing section 11i acquires the ISC requested torque Tisc from the ISC requested torque calculation section. Subsequently, the lower limit guard processing section 11i determines whether or not the post-division target torque Tm2 is not less than the ISC requested torque Tisc and, in a case where the determination result is affirmative, the lower limit guard processing section 11i outputs the post-division target torque Tm2 as the post-lower limit guard processing target torque Tm3. On the other hand, in a case where the determination result is negative, the lower limit guard processing section 11i outputs the ISC requested torque Tisc as the post-lower limit guard processing target torque Tm3.

The torque filter processing section 11*j* removes a specific frequency component (e.g., a high-frequency component) included in the post-lower limit guard processing target torque Tm3 from the lower limit guard processing section 11*i*, and outputs the removal result (hereinafter referred to as a post-filter processing target torque) Tm4 to the torque processing section 11*k*.

The torque processing section 11*k* performs torque processing that prevents a sharp change of the post-filter processing target torque Tm4 from the torque filter processing section 11*j*, and outputs the processing result (hereinafter referred to as a post-torque processing target torque) Tm5 to the conversion section 11*m*. More specifically, in a case where the sharp increase or decrease of a predetermined value or more occurs in the post-filter processing target torque Tm4, the torque processing section 11*k* changes the post-filter processing target torque Tm4 so as to prevent the sharp increase or decrease, and outputs the changed post-filter processing target torque as the post-torque processing target torque Tm5. On the other hand, in a case where the sharp increase or decrease of the predetermined value or more does not occur in the post-filter processing target torque Tm4, the torque processing section 11*k* outputs the post-filter processing target torque Tm4 as the post-torque processing target torque Tm5.

The conversion section 11*m* converts the post-torque processing target torque Tm5 from the torque processing section 11*k* to a load factor KLm1, and outputs the load factor KLm1 to the lower limit guard processing section 11*n*. More specifically, a first conversion map MP1 that defines the relationship among the post-torque processing target torque Tm5, the engine rotational speed Ne, the target air-fuel ratio AFm, and the load factor KLm1 is set in the conversion section 11*m*. The conversion section 11*m* acquires the post-torque processing target torque Tm5 from the torque processing section 11*k*, acquires the engine rotational speed Ne from the engine rotational speed sensor, and acquires the target air-fuel ratio AFm from the adjustment section 11*d*. Subsequently, the conversion section 11*m* determines the load factor KLm1 corresponding to the acquired post-torque processing target torque Tm5, engine rotational speed Ne, and target air-fuel ratio AFm by using the first conversion map MP1.

The lower limit guard processing section 11*n* performs lower limit guard processing on the load factor KLm1 from the conversion section 11*m*, and outputs the processing result to the target throttle opening calculation section 11*f* and the abnormality detection device 13 as the target load factor KLm. More specifically, the lower limit value of the load factor KLm1 is set to a load factor lower limit guard value KLmin. The lower limit guard processing section 11*n* determines whether or not the load factor KLm1 is not less than the load factor lower limit guard value KLmin and, in a case where the determination result is affirmative, the lower limit guard processing section 11*n* outputs the load factor KLm1 as the target load factor KLm. On the other hand, in a case where the determination result is negative, the lower limit guard processing section 11*n* outputs the load factor lower limit guard value KLmin as the target load factor KLm.

The target throttle opening calculation section 11*f* calculates the target throttle opening θm such that the target throttle opening θm is increased/decreased in accordance with an increase/decrease in the target load factor KLm. Herein, a second conversion map MP2 that defines the relationship between, e.g., the target load factor KLm and the target throttle opening θm is set in the target throttle opening calculation section 11*f*. The target throttle opening calculation section 11*f* determines the target throttle opening θm corresponding to the target load factor KLm from the target load factor calculation section 11*e* by using the second conversion map MP2.

The abnormality detection device 13 calculates the target torque (i.e., the target torque for monitoring) Tma by using, e.g., the target load factor KLm from the target load factor calculation section 11*e* and the target ignition timing SAm from the control amount calculation element 11*b*, calculates the torque deviation ΔTm (=the target torque for monitoring Tma−the target torque Tm) between the target torque for monitoring Tma and the target torque Tm from the adjustment section 11*d*, and determines the presence or absence of the abnormality based on the torque deviation ΔTm.

More specifically, as shown in FIG. 2, the abnormality detection device 13 includes a target efficiency for monitoring calculation section 13*a*, a target torque for monitoring calculation section 13*b*, an operation section 13*c*, determination sections 13*d* and 13*f*, and an increment processing section 13*e*.

As shown in FIG. 3, the target efficiency for monitoring calculation section 13*a* includes an operation section 13*g* and a conversion section 13*h*.

The operation section 13*g* subtracts the MBT ignition timing SAmbt from the MBT ignition timing calculation section from the target ignition timing SAm from the control amount calculation element 11*b*, and outputs the subtraction result (hereinafter referred to as an ignition retard angle amount) α to the conversion section 13*h*.

The conversion section 13*h* calculates the target efficiency (i.e., the target efficiency for monitoring) ηma by using the ignition retard angle amount α from the operation section 13*g*, and outputs the calculation result to the target torque for monitoring calculation section 13*b*. More specifically, a third conversion map MP3 that defines the relationship among the ignition retard angle amount α, the actual load factor KLr, the engine rotational speed Ne, and the target efficiency for monitoring ηma is set in the conversion section 13*h*. The conversion section 13*h* acquires the ignition retard angle amount α from the operation section 13*g*, acquires the actual load factor KLr from the actual load factor calculation section, and acquires the engine rotational speed Ne from the engine rotational speed sensor. Subsequently, the conversion section 13*h* determines the target efficiency for monitoring ηma corresponding to the acquired ignition retard angle amount α, actual load factor KLr, and engine rotational speed Ne by using the third conversion map MP3.

As shown in FIG. 3, the target torque for monitoring calculation section 13*b* includes a conversion section 13*i*, operation sections 13*j* and 13*m*, and an upper limit guard processing section 13*k*.

The conversion section 13*i* converts the target load factor KLm from the target load factor calculation section 11*e* to the MBT torque Tmbt, and outputs the conversion result to the operation section 13*j*. More specifically, a fourth conversion map MP4 that defines the relationship among the target load factor KLm, the engine rotational speed Ne, the air-fuel ratio AF, and the MBT torque Tmbt is set in the conversion section 13*i*. The conversion section 13*i* acquires the target load factor KLm from the target load factor calculation section 11*e*, acquires the engine rotational speed Ne from the engine rotational speed sensor, fixes the air-fuel ratio AF to a predetermined value (e.g., 12.5), and determines the MBT torque Tmbt corresponding to the acquired target load factor KLm and engine rotational speed Ne by using the fourth conversion map MP4.

The operation section 13*j* multiplies the MBT torque Tmbt from the conversion section 13*i* by the target efficiency for monitoring ηma from the target efficiency for monitoring calculation section 13*a*, and outputs the multiplication result (hereinafter referred to as a post-multiplication torque) Tma1 to the operation section 13*m*. With this multiplication processing, the post-multiplication torque Tma1 is increased/decreased in accordance with an increase/decrease in each of the MBT torque Tmbt and the target efficiency for monitoring ηma.

The upper limit guard processing section 13*k* performs upper limit guard processing on the pump loss torque Tp from the pump loss torque calculation section, and outputs the processing result (hereinafter referred to as a post-upper limit guard processing pump loss torque) Tp' to the operation section 13*m*. More specifically, the upper limit value of the pump loss torque Tp is set to a predetermined upper limit guard value Tpmax. The upper limit guard processing section 13*k* determines whether or not the pump loss torque Tp is not more than the predetermined upper limit guard value Tpmax and, in a case where the determination result is affirmative, the upper limit guard processing section 13*k* outputs the pump loss torque Tp as the post-upper limit guard processing pump loss torque Tp'. On the other hand, in a case where the determination result is negative, the upper limit guard processing section 13*k* outputs the predetermined upper limit guard value Tpmax as the post-upper limit guard processing pump loss torque Tp'.

The operation section 13*m* subtracts the post-upper limit guard processing pump loss torque Tp' from the upper limit guard processing section 13*k* from the post-multiplication torque Tma1 from the operation section 13*j*, and outputs the subtraction result to the operation section 13*c* as the target torque for monitoring Tma.

The operation section 13*c* calculates the torque deviation ΔTm by subtracting the target torque Tm from the adjustment section 11*d* from the target torque for monitoring Tma from the operation section 13*m*.

The determination section 13*d* determines whether or not the torque deviation ΔTm from the operation section 13*c* is not less than a first threshold value ΔTm1. In a case where the determination result of the determination section 13*d* is affirmative, the increment processing section 13*e* increments a count number Nc (i.e., increments the count number Nc by 1). On the other hand, in a case where the determination result of the determination section 13*d* is negative, the increment processing section 13*e* resets the count number Nc to 0.

The determination section 13*f* determines whether or not the count number Nc in the increment processing section 13*e* is not less than a second threshold value Nc1. In a case where the determination result is affirmative, the determination section 13*f* determines that the abnormality is present. More specifically, the determination section 13*f* determines that the abnormality in which the target torque for monitoring Tma becomes excessively larger than the target torque Tm, i.e., the abnormality in which the torque more excessive than the torque intended to be output by the driver is output is present. On the other hand, in a case where the determination result is negative, the determination section 13*f* determines that the abnormality is not present.

Herein, since the count number Nc is reset in the case where the determination result of the determination section 13*d* is negative, it is determined that the abnormality is present only when the count number Nc is incremented successively the number of times corresponding to the threshold value Nc1. However, by holding the count number Nc in the case where the determination result of the determination section 13*d* is negative, it may be determined that the abnormality is present when the count number Nc is intermittently incremented and reaches the threshold value Nc1.

Figure 5:
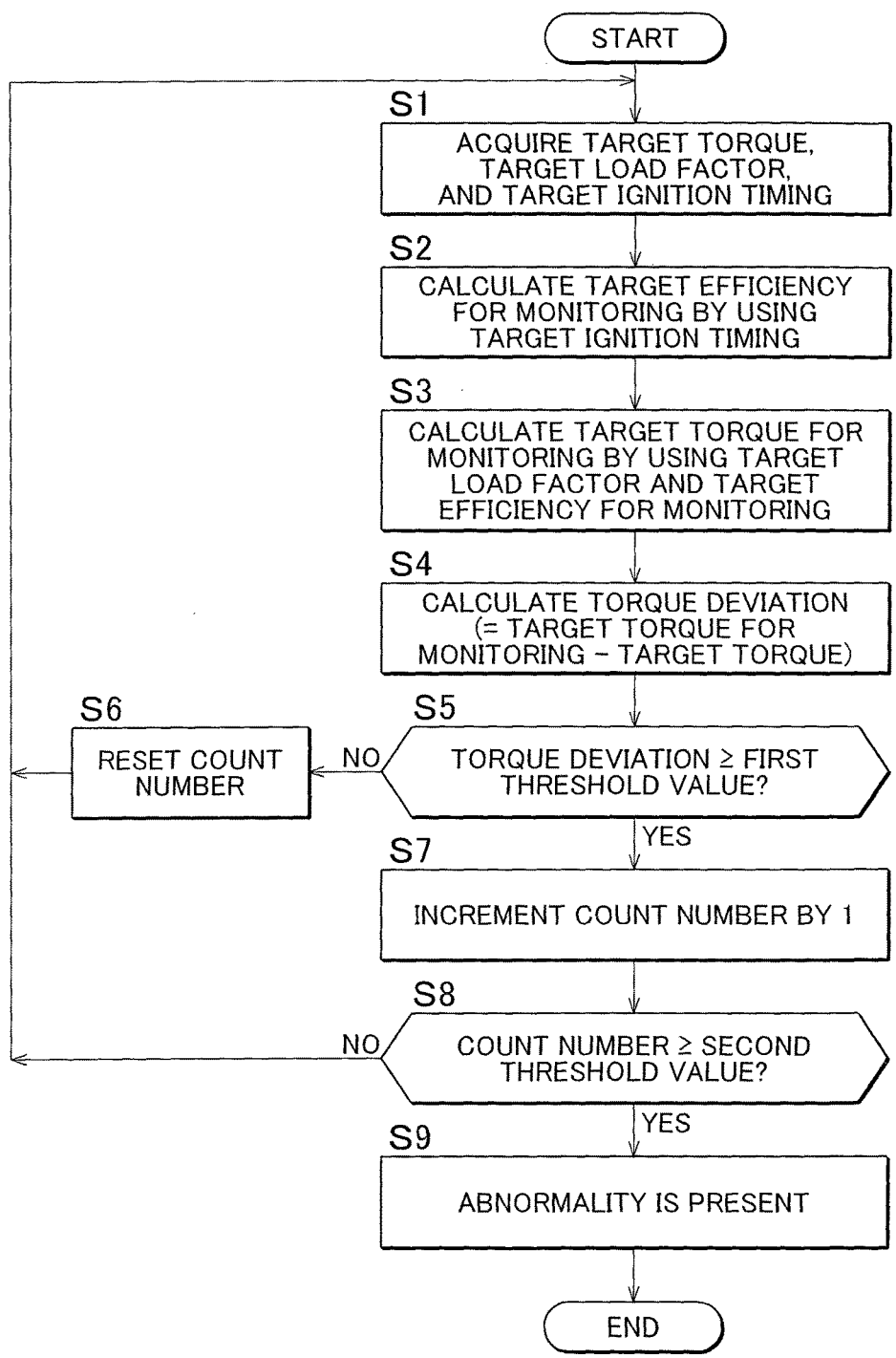
FIG. 5 is a flowchart for explaining the operation of the abnormality detection device according to the first embodiment of the invention.

Next, the operation of the abnormality detection device 13 will be described based on FIGS. 2, 3, and 5. FIG. 5 is a flowchart for explaining the operation of the abnormality detection device according to the first embodiment.

In step S1, as shown in FIG. 2, the abnormality detection device 13 acquires the target torque Tm from the adjustment section 11*d*, acquires the target load factor KLm from the target load factor calculation section 11*e*, and acquires the target ignition timing SAm from the control amount calculation element 11*b*.

In step S2, as shown in FIG. 2, the abnormality detection device 13 calculates the target efficiency for monitoring ηma by using the target ignition timing SAm. More specifically, as shown in FIG. 3, the abnormality detection device 13 further acquires the MBT ignition timing SAmbt, the actual load factor KLr, and the engine rotational speed Ne from the various calculation sections and sensors of the engine control device 1. Subsequently, the abnormality detection device 13 calculates the ignition retard angle amount α by subtracting the MBT ignition timing SAmbt from the target ignition timing SAm in the target efficiency for monitoring calculation section 13*a*, and determines the target efficiency for monitoring ηma corresponding to the ignition retard angle amount α, the actual load factor KLr, and the engine rotational speed Ne by using the third conversion map MP3.

In step S3, as shown in FIG. 2, the abnormality detection device 13 calculates the target torque for monitoring Tma by using the target load factor KLm and the target efficiency for monitoring ηma. More specifically, as shown in FIG. 3, the abnormality detection device 13 further acquires the pump loss torque Tp from the pump loss torque calculation section of the engine control device 1. Subsequently, the abnormality detection device 13 fixes the air-fuel ratio AF to the predetermined value (e.g., 1.5) and determines the MBT torque Tmbt corresponding to the target load factor KLm and the engine rotational speed Ne by using the second conversion map MP2 in the conversion section 13*i*. Then, the abnormality detection device 13 determines the post-multiplication torque Tma1 by multiplying the MBT torque Tmbt and the target efficiency for monitoring ηma together in the operation section 13*j*. In addition, the abnormality detection device 13 determines the post-upper limit guard processing pump loss torque Tp' by performing the upper limit guard processing on the pump loss torque Tp in the upper limit guard processing section 13*k*. Subsequently, the abnormality detection device 13 determines the target torque for monitoring Tma by subtracting the post-upper limit guard processing pump loss torque Tp' from the post-multiplication torque Tma1 in the operation section 13*m*.

In step S4, the abnormality detection device 13 determines the torque deviation ΔTm (=Tma−Tm) by subtracting the target torque Tm from the target torque for monitoring Tma in the operation section 13*c*.

In step S5, the abnormality detection device 13 determines whether or not the torque deviation ΔTm is not less than the first threshold value ΔTm1 in the determination section 13*d*. In a case where the determination result is Yes, the processing moves to step S7. On the other hand, in a case where the determination result is No, the processing moves to step S6.

In step S6, the abnormality detection device 13 resets the count number Nc to 0 in the increment processing section 13e. Subsequently, the processing returns to step S1.

In step S7, the abnormality detection device 13 increments the count number Nc by 1 in the increment processing section 13e. Subsequently, the processing moves to step S8.

In step S8, the abnormality detection device 13 determines whether or not the count number Nc is not less than the second threshold value Nc1 in the determination section 13f. In a case where the determination result is negative (No), the determination section 13f determines that the abnormality is not present, and the processing returns to step S1. On the other hand, in a case where the determination result is affirmative (Yes), the determination section 13f determines that the abnormality is present, and the processing ends.

As shown in FIG. 2, in the engine control device 1, in a case where the target torque Tm is 10 Nm and the target efficiency ηm is one times the normal value, the target load factor KLm becomes 10%, the target throttle opening θm becomes 5°, and the target ignition timing SAm becomes 0°. In this state, when the target efficiency ηm is unusually decreased, e.g., when the target efficiency ηm is unusually decreased from one times the normal value to 0.1 times the normal value, the target load factor KLm is increased to 50%, the target throttle opening θm is increased to 70°, and the output torque T of the engine 3 becomes excessively larger than the target torque Tm (=10 Nm).

Consequently, in the engine control device 1, the target ignition timing SAm is retarded in order to achieve the target torque Tm, i.e., in order to cause the output torque T to match the target torque Tm. However, since the retard angle limit of the target ignition timing SAm is set to the misfire limit (e.g., −20°), the target ignition timing SAm can be retarded only to the misfire limit, and cannot be retarded to the retard angle (e.g., −40°) required to achieve the target torque Tm. Accordingly, the output torque T becomes excessively larger than the target torque Tm.

In this case, as described above, in the abnormality detection device 13, since the target efficiency for monitoring ηma is calculated by using the target ignition timing SAm having the retard angle limit set to the misfire limit, in the case where the target efficiency ηm is unusually decreased, a decrease in the target efficiency for monitoring ηma becomes smaller than a decrease in the target efficiency ηm. Further, since the target torque for monitoring Tma is calculated by using the target efficiency for monitoring ηma and the target load factor KLm, the decrease in the target efficiency for monitoring ηma and an increase in the target load factor KLm don't cancel each other sufficiently in the calculation, and the target torque for monitoring Tma becomes sufficiently larger than the target torque Tm. With this, the torque deviation ΔTm becomes larger than the threshold value (the first threshold value) ΔTm1, and it becomes possible to detect the abnormality. Specifically, the above abnormality is an abnormality in which the target efficiency is unusually decreased and the excessive torque is output.

Thus, according to the first embodiment, since the target efficiency for monitoring ηma is calculated by using the target ignition timing SAm having the retard angle limit set to the misfire limit, in the case where the target efficiency ηm is unusually decreased, i.e., in the case where the excessive torque is output, the decrease in the target efficiency for monitoring ηma becomes smaller than the decrease in the target efficiency ηm. In addition, since the target torque for monitoring Tma is calculated by using the target efficiency for monitoring ηma and the target load factor KLm, the decrease in the target efficiency for monitoring ηma and the increase in the target load factor KLm don't cancel each other sufficiently in the calculation, and the target torque for monitoring Tma becomes sufficiently larger than the target torque Tm. With this, the torque deviation ΔTm becomes larger than the first threshold value ΔTm1, and it is possible to detect the abnormality in which the target efficiency ηm is unusually decreased and the excessive torque is output.

Figure 6:
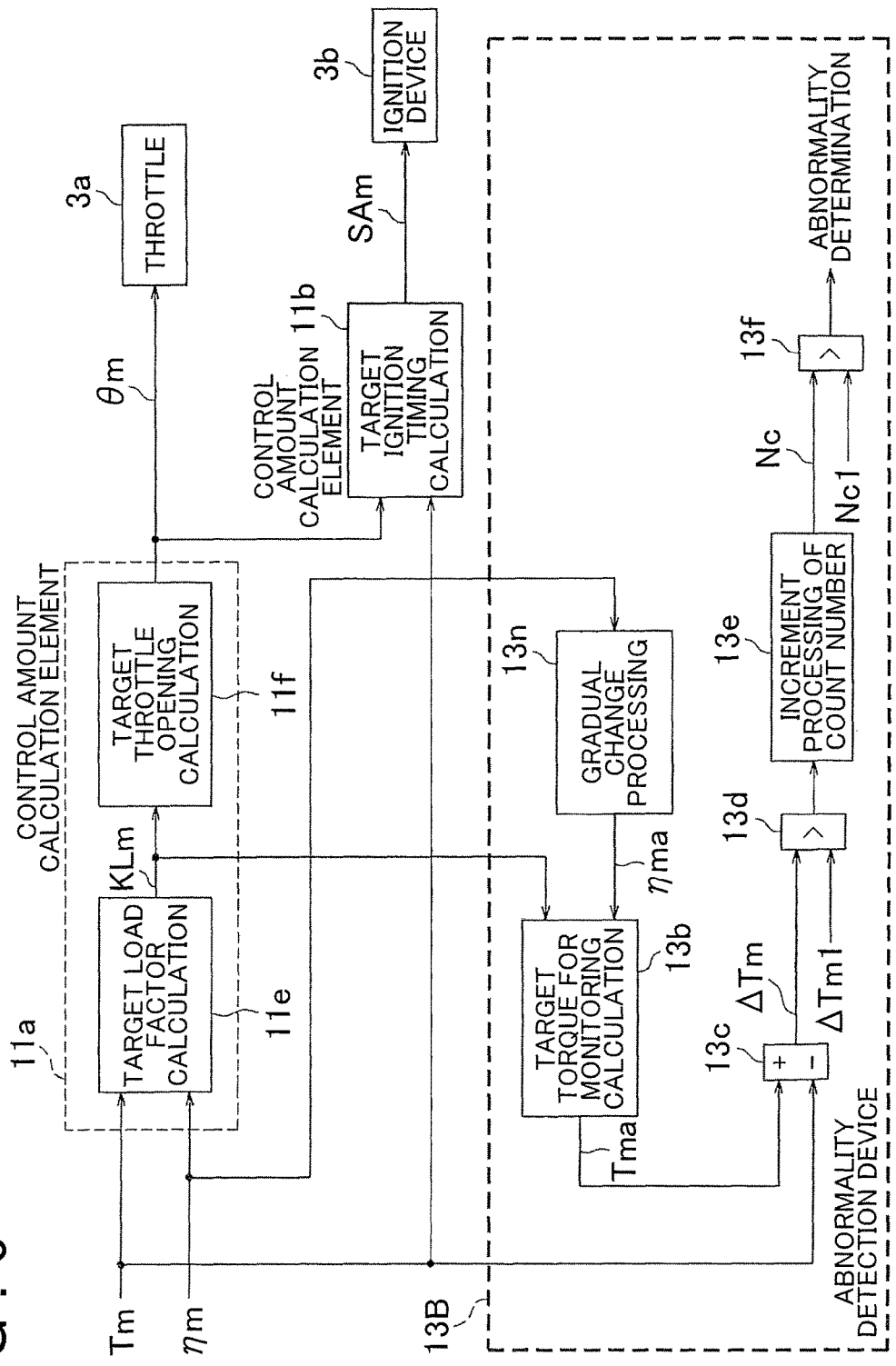
FIG. 6 is an enlarged view of the principal portion of the engine control device on which an abnormality detection device according to a second embodiment of the invention is mounted.
Figure 7:
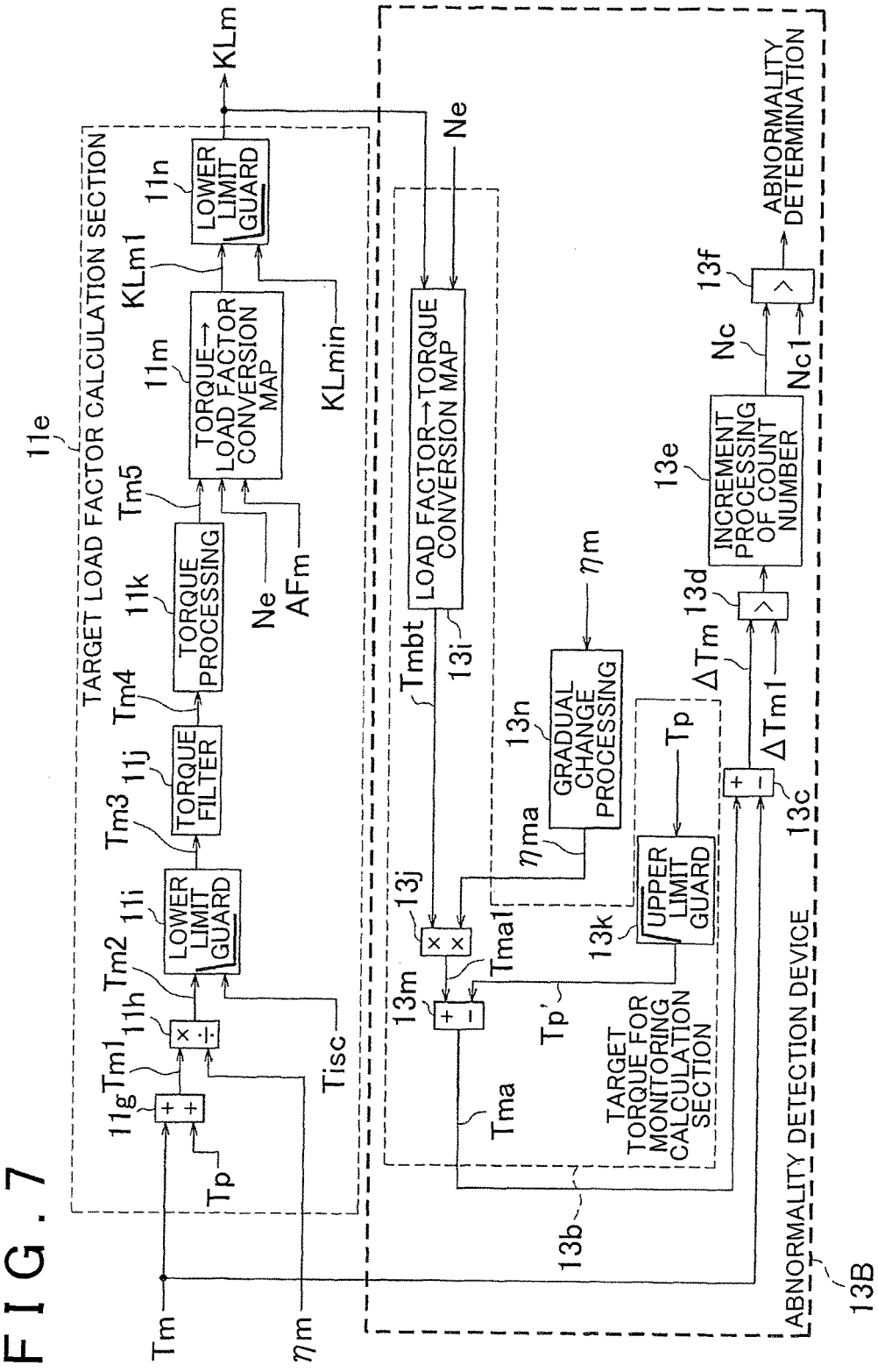
FIG. 7 is a view showing the schematic configuration of each of a target load factor calculation section and a target torque for monitoring calculation section of FIG. 6.

FIG. 6 is an enlarged view of the principal portion of the engine control device on which an abnormality detection device according to a second embodiment is mounted. FIG. 7 is a view showing the schematic configuration of each of a target load factor calculation section and a target torque for monitoring calculation section of FIG. 6.

An abnormality detection device 13B according to this embodiment calculates a post-gradual change target efficiency ηmb by performing gradual change processing on the target efficiency ηm, and calculates the target torque for monitoring Tma by using the post-gradual change target efficiency ηmb and the target load factor KLm instead of calculating the target efficiency for monitoring ηma by using the target ignition timing SAm and calculating the target torque for monitoring Tma by using the target efficiency for monitoring ηma and the target load factor KLm in a series of the processing of the abnormality detection device 13 according to the first embodiment. Hereinbelow, the abnormality detection device 13B according to the second embodiment will be described in detail based on FIGS. 6 and 7.

The abnormality detection device 13B includes a gradual change processing section 13n instead of the target efficiency for monitoring calculation section 13a in the abnormality detection device 13 according to the first embodiment.

The gradual change processing section 13n performs the gradual change processing on the target efficiency ηm from the adjustment section 11d, and outputs the processing result (i.e., the post-gradual change target efficiency) ηmb to the target torque for monitoring calculation section 13b.

More specifically, in a case where the target efficiency ηm (hereinafter referred to as a target efficiency ηm (n)) acquired from the adjustment section 11d in a series of the present (n-th) processing is larger than the target efficiency ηm (hereinafter referred to as a target efficiency ηm (n−1)) acquired from the adjustment section 11d in a series of the previous ((n−1)-th) processing, the gradual change processing section 13n adds a predetermined gradual change amount δη to the previous target efficiency ηm (n−1) as the gradual change processing, and outputs the addition result as the post-gradual change target efficiency ηmb. On the other hand, in a case where the present target efficiency ηm (n) is smaller than the previous target efficiency ηm (n−1), the gradual change processing section 13n subtracts the predetermined gradual change amount δη from the previous target efficiency ηm (n−1) as the gradual change processing, and outputs the subtraction result as the post-gradual change target efficiency ηmb. In addition, in a case where the present target efficiency ηm (n) is equal to the previous target efficiency ηm (n−1), the gradual change processing section 13n outputs the present target efficiency ηm (n) or the previous target efficiency ηm (n−1) as the post-gradual change target efficiency ηmb. Since the post-gradual change target efficiency ηmb is calculated in this manner, in the case where the target efficiency ηm is unusually decreased, it is possible to make a decrease in the post-gradual change target efficiency ηmb smaller than the decrease in the target efficiency ηm more reliably.

Note that the gradual change processing is processing for detecting the unusual decrease in the target efficiency ηm, and hence the gradual change processing may be performed only in the case where the present target efficiency ηm (n) is smaller than the previous target efficiency ηm (n−1).

In addition, the gradual change amount δη is an amount that is sufficiently smaller than the difference between the previous target efficiency ηm (n−1) and the present target efficiency ηm (n), and can be set to, e.g., a value corresponding to 0.05 times the difference therebetween.

Herein, although the gradual change amount δη is added to or subtracted from the previous target efficiency ηm (n−1) as the gradual change processing, the gradual change processing is not limited thereto, and any processing may be performed as the gradual change processing as long as the processing dose not sharply change the target efficiency ηm in a case where the previous target efficiency ηm (n−1) is different from the present target efficiency ηm (n). More specifically, an example of the processing includes processing in which the target efficiency ηm is adjusted to a value between the target efficiency ηm (n−1) and the target efficiency ηm (n).

Similarly to the first embodiment, the target torque for monitoring calculation section 13b of the second embodiment calculates the target torque for monitoring Tma by using the target load factor KLm from the target load factor calculation section 11e and the post-gradual change target efficiency ηmb from the gradual change processing section 13n.

Other constituent elements of the second embodiment are the same as those of the first embodiment so that like constituent elements are designated by like reference numerals and the description thereof will be omitted.

Figure 8:
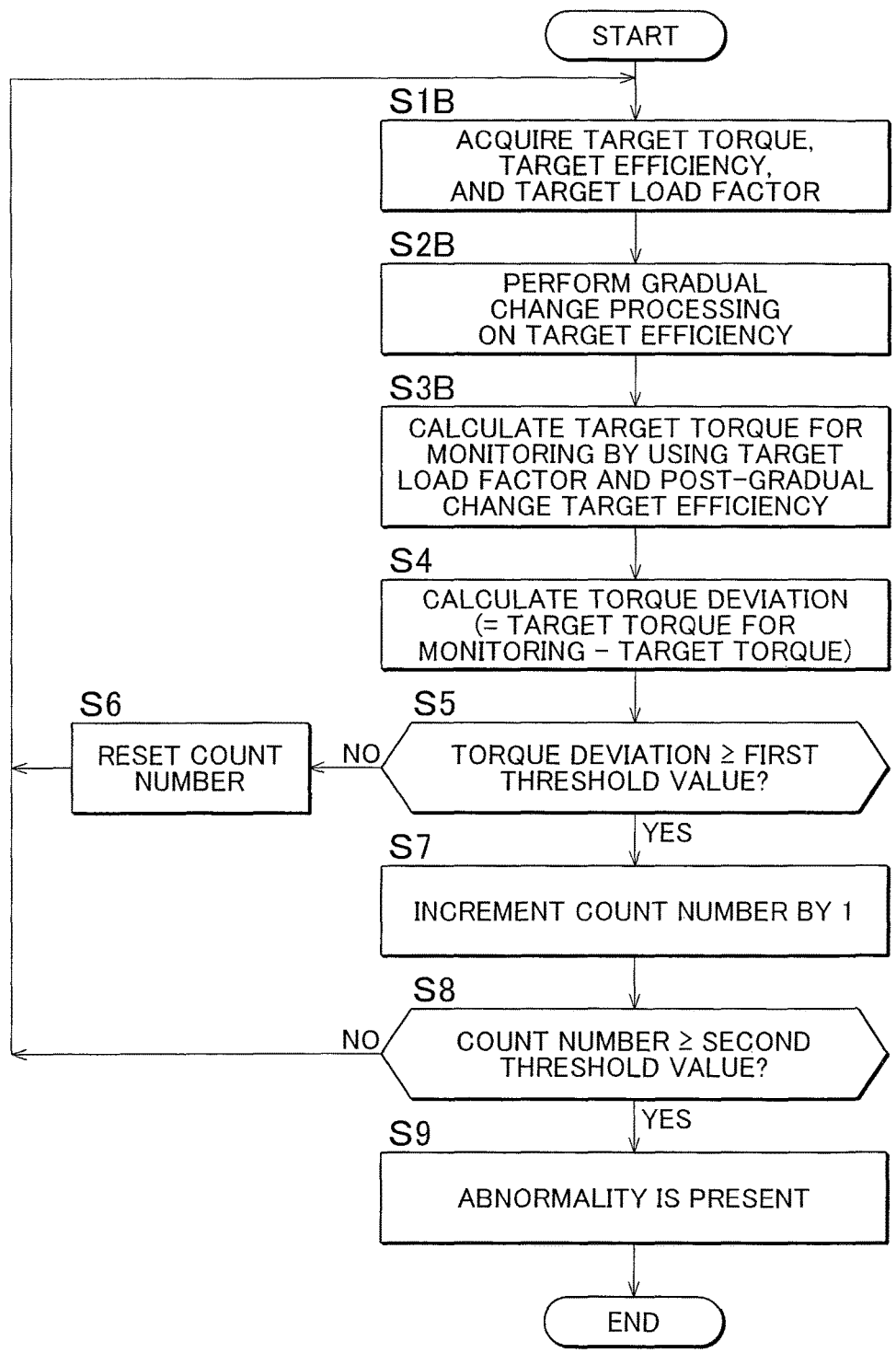
FIG. 8 is a flowchart for explaining the operation of the abnormality detection device according to the second embodiment of the invention.

Next, the operation of the abnormality detection device 13B will be described based on FIGS. 6, 7, and 8. FIG. 8 is a flowchart for explaining the operation of the abnormality detection device according to the second embodiment.

In step S1B, the abnormality detection device 13B acquires the target torque Tm and the target efficiency ηm from the adjustment section 11d, and acquires the target load factor KLm from the target load factor calculation section 11e (see FIG. 6).

In step S2B, the abnormality detection device 13B performs the gradual change processing on the target efficiency ηm, and outputs the gradual change result (the post-gradual change target efficiency) ηmb to the target torque for monitoring calculation section 13b. More specifically, in the case where the target efficiency ηm (n) acquired from the adjustment section 11d in a series of the present processing is larger than the target efficiency ηm (n−1) acquired from the adjustment section 11d in a series of the previous processing, the gradual change processing section 13n of the abnormality detection device 13B adds the predetermined gradual change amount δη to the previous target efficiency ηm (n−1) as the gradual change processing, and outputs the addition result as the post-gradual change target efficiency ηmb. On the other hand, in the case where the present target efficiency ηm (n) is smaller than the previous target efficiency ηm (n−1), the gradual change processing section 13n subtracts the predetermined gradual change amount δη from the previous target efficiency ηm (n−1) as the gradual change processing, and outputs the subtraction result as the post-gradual change target efficiency ηmb. In addition, in the case where the present target efficiency ηm (n) is equal to the previous target efficiency ηm (n−1), the gradual change processing section 13n outputs the previous target efficiency ηm (n−1) or the present target efficiency ηm (n) as the post-gradual change target efficiency ηmb.

In step S3B, the abnormality detection device 13B calculates the target torque for monitoring Tma by using the target load factor KLm and the post-gradual change target efficiency ηmb (see FIG. 6). More specifically, as shown in FIG. 7, the abnormality detection device 13B further acquires the pump loss torque Tp from the pump loss torque calculation section of the engine control device 1. Subsequently, the abnormality detection device 13B fixes the air-fuel ratio AF to the predetermined value (e.g., 1.5) and determines the MBT torque Tmbt corresponding to the target load factor KLm and the engine rotational speed Ne by using the second conversion map in the conversion section 13i. Then, the abnormality detection device 13B multiplies the MBT torque Tmbt and the post-gradual change target efficiency ηmb together in the operation section 13j, and outputs the multiplication result (the post-multiplication torque) Tma1 to the operation section 13m. In addition, the abnormality detection device 13B performs the upper limit guard processing on the pump loss torque Tp in the upper limit guard processing section 13k, and outputs the processing result (i.e., the post-upper limit guard processing pump loss torque) Tp' to the operation section 13m. Subsequently, the abnormality detection device 13B determines the target torque for monitoring Tma by subtracting the post-upper limit guard processing pump loss torque Tp' from the post-gradual change target efficiency ηmb in the operation section 13m.

Steps S4 to S9 are the same as steps S4 to S9 of the first embodiment so that the description thereof will be omitted.

Thus, according to the second embodiment, since the post-gradual change target efficiency ηmb is calculated by performing the gradual change processing on the target efficiency ηm, and the target torque for monitoring Tma is calculated by using the post-gradual change target efficiency ηmb and the target load factor KLm, in the case where the target efficiency ηm is unusually decreased, the decrease in the post-gradual change target efficiency ηmb becomes smaller than the decrease in the target efficiency ηm. Consequently, in the calculation of the target torque for monitoring Tma, the decrease in the post-gradual change target efficiency ηmb and the increase in the target load factor KLm don't cancel each other sufficiently, and the target torque for monitoring Tma becomes sufficiently larger than the target torque Tm. With this, similarly to the case of the first embodiment, the torque deviation ΔTm becomes larger than the first threshold value ΔTm1, and it is possible to detect the abnormality in which the target efficiency ηm is unusually decreased and the excessive torque is output.

Figure 9:
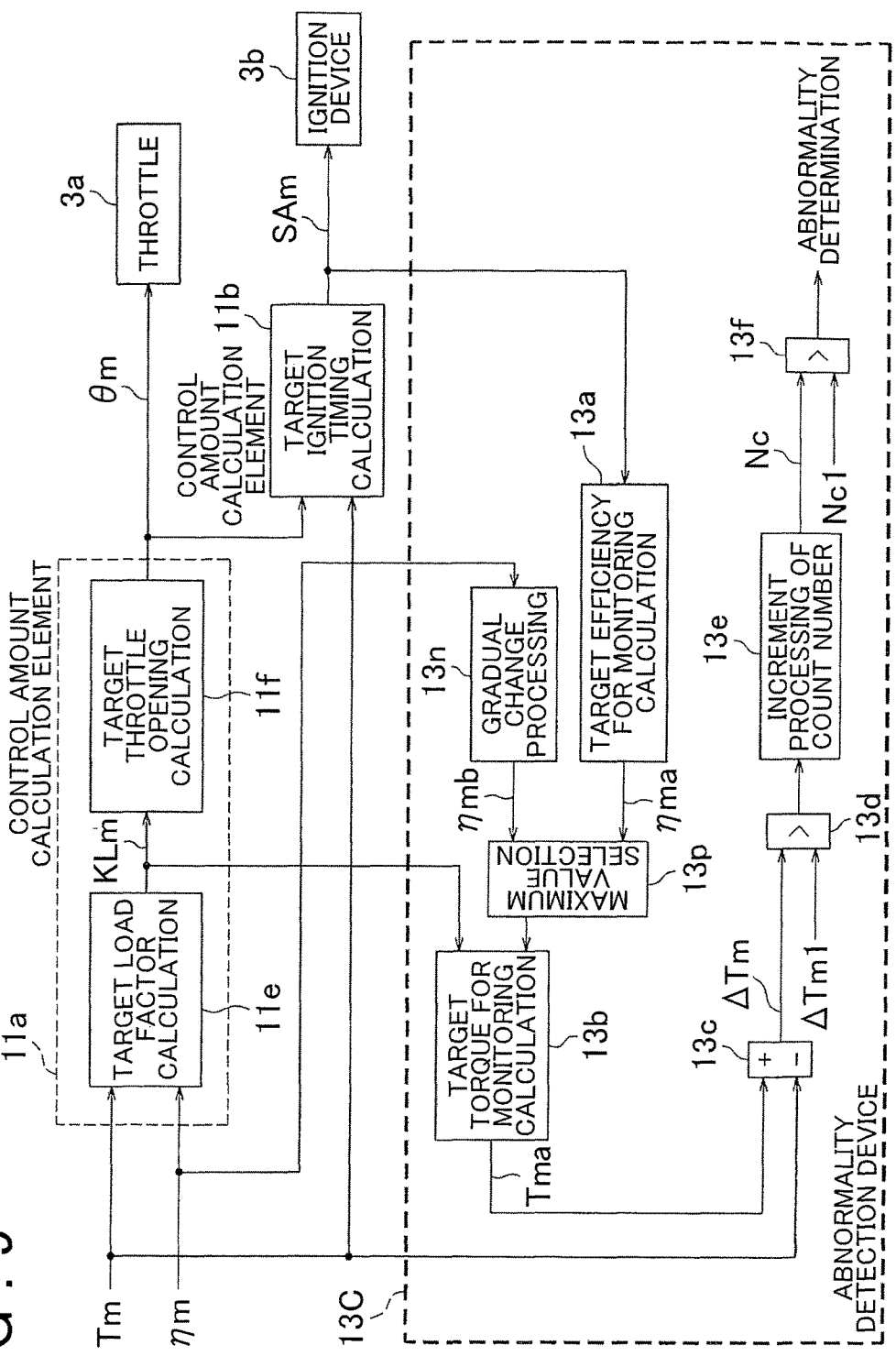
FIG. 9 is an enlarged view of the principal portion of the engine control device on which an abnormality detection device according to a third embodiment of the invention is mounted.
Figure 10:
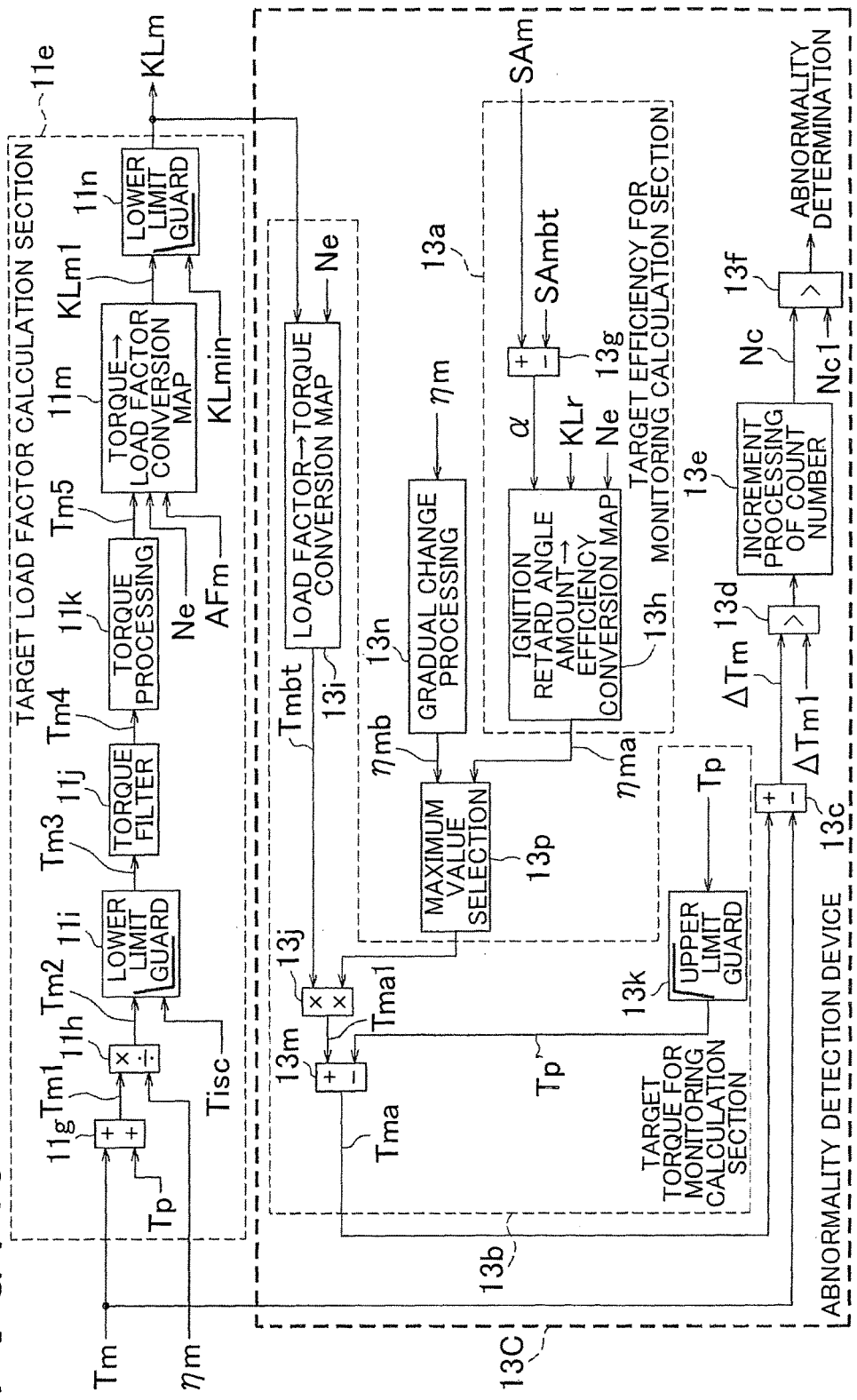
FIG. 10 is a view showing the schematic configuration of each of a target load factor calculation section, a target efficiency for monitoring calculation section, and a target torque for monitoring calculation section of FIG. 9.

FIG. 9 is an enlarged view of the principal portion of the engine control device on which an abnormality detection device according to a third embodiment is mounted. FIG. 10 is a view showing the schematic configuration of each of a target load factor calculation section, a target efficiency for monitoring calculation section, and a target torque for monitoring calculation section of FIG. 9.

An abnormality detection device 13C according to the third embodiment calculates the post-gradual change target efficiency ηmb by performing the gradual change processing on the target efficiency ηm, and uses the larger one of the post-gradual change target efficiency ηmb and the target efficiency for monitoring ηma in the calculation of the target torque for monitoring Tma in a series of the processing of the abnormality detection device 13 according to the first embodiment. Hereinbelow, the abnormality detection device 13C according to the third embodiment will be described in detail based on FIGS. 9 and 10.

The abnormality detection device 13C further includes the gradual change processing section 13n that performs the gradual change processing on the target efficiency ηm from the adjustment section 11d, and a maximum value selection section 13p that selects the larger one of the target efficiency for monitoring ηma from the target efficiency for monitoring calculation section 13a and the post-gradual change target efficiency ηmb from the gradual change processing section 13n, and outputs the selection result to the target torque for monitoring calculation section 13b in the abnormality detection device 13 according to the first embodiment.

The gradual change processing section 13n is configured similarly to the gradual change processing section 13n of the second embodiment.

The target torque for monitoring calculation section 13b of this embodiment calculates the target torque for monitoring Tma by using the target load factor KLm from the target load factor calculation section 11e and the target efficiency (the target efficiency for monitoring ηma or the post-gradual change target efficiency ηmb) from the maximum value selection section 13p. At this point, in a case where the target efficiency for monitoring ηma is used, the target torque for monitoring Tma is calculated similarly to the first embodiment. In a case where the post-gradual change target efficiency ηmb is used, the target torque for monitoring Tma is calculated similarly to the second embodiment.

Other constituent elements of the third embodiment are the same as those of the first embodiment so that like constituent elements are designated by like reference numerals and the description thereof will be omitted.

Figure 11:
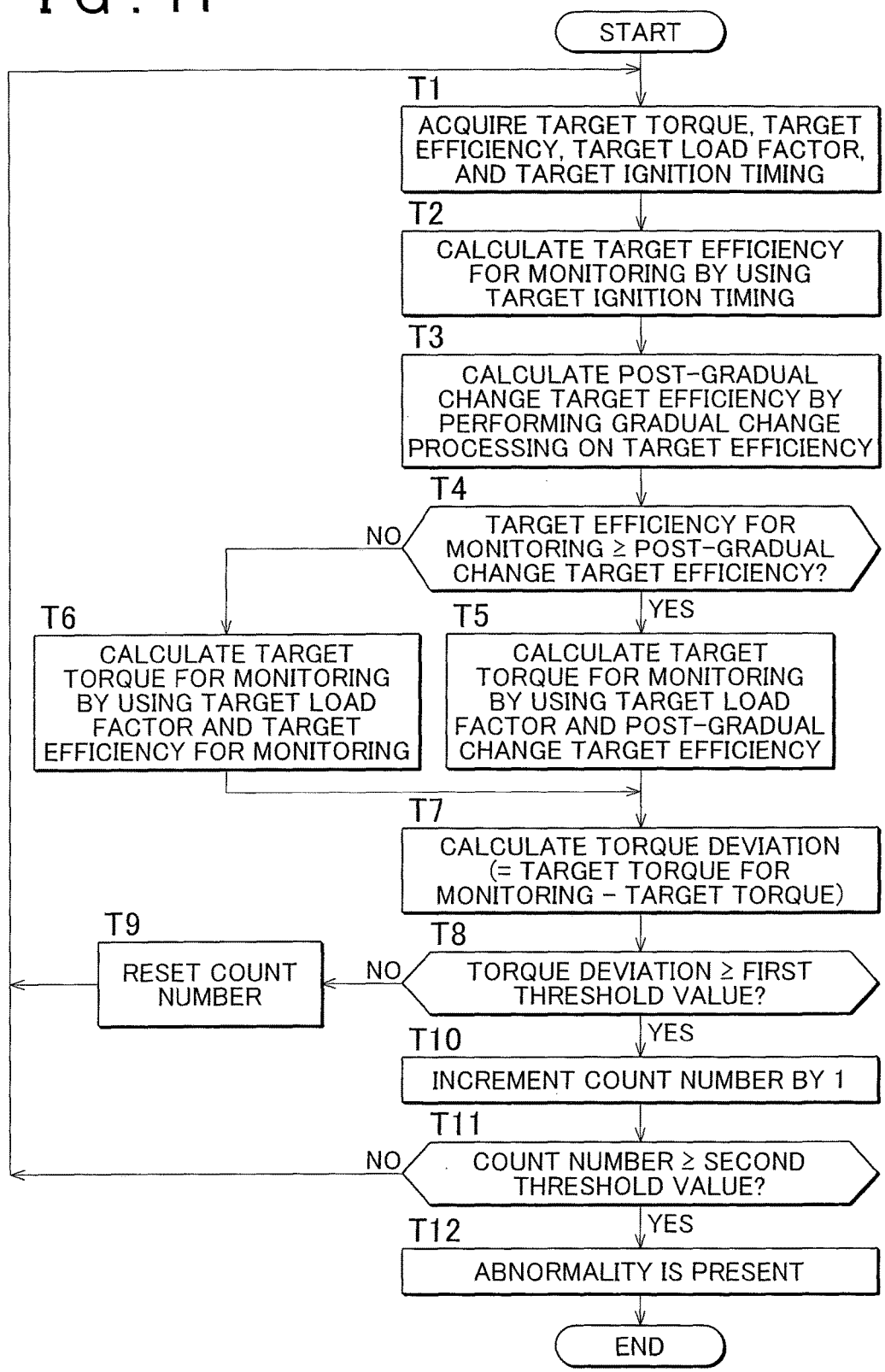
FIG. 11 is a flowchart for explaining the operation of the abnormality detection device according to the third embodiment of the invention.

Next, the operation of the abnormality detection device 13C will be described based on FIG. 11. FIG. 11 is a flowchart for explaining the operation of the abnormality detection device according to the third embodiment.

In step T1, the abnormality detection device 13C acquires the target torque Tm and the target efficiency ηm from the adjustment section 11d, acquires the target load factor KLm from the target load factor calculation section 11e, and acquires the target ignition timing SAm from the control amount calculation element 11b.

In step T2, similarly to step S2 of the first embodiment, the abnormality detection device 13C calculates the target efficiency for monitoring ηma by using the target ignition timing SAm.

In step T3, similarly to step S2B of the second embodiment, the abnormality detection device 13C calculates the post-gradual change target efficiency ηmb by performing the gradual change processing on the target efficiency ηm from the adjustment section 11d.

In step T4, the maximum value selection section 13p of the abnormality detection device 13C selects the larger one of the target efficiency for monitoring ηma calculated in step T2 and the post-gradual change target efficiency ηmb calculated in step T3. More specifically, the maximum value selection section 13p determines whether or not the target efficiency for monitoring ηma calculated in step T2 is not less than the post-gradual change target efficiency ηmb calculated in step T3. In a case where the determination result is affirmative (Yes), the maximum value selection section 13p selects the post-gradual change target efficiency ηmb calculated in step T3. Subsequently, the processing moves to step T5. On the other hand, in a case where the determination result is negative (No), the maximum value selection section 13p selects the target efficiency for monitoring ηma calculated in step T2. Subsequently, the processing moves to step T6.

In step T5, similarly to step S3B of the second embodiment, the abnormality detection device 13C calculates the target torque for monitoring Tma by using the target load factor KLm and the post-gradual change target efficiency ηmb in the target torque for monitoring calculation section 13b. Subsequently, the processing moves to step T7.

In step T6, similarly to step S3 of the first embodiment, the abnormality detection device 13C calculates the target torque for monitoring Tma by using the target load factor KLm and the target efficiency for monitoring ηma in the target torque for monitoring calculation section 13b. Subsequently, the processing moves to step T7.

In steps T7 to T12, the same processing as that of steps S4 to S9 of the first embodiment is performed so that the description thereof will be omitted. Note that, after the processing of each of steps T9 and T11, the processing returns to step T1.

Thus, according to the third embodiment, since the post-gradual change target efficiency ηmb is calculated by performing the gradual change processing on the target efficiency ηm in a series of the processing of the abnormality detection device 13 of the first embodiment, and the larger one of the target efficiency for monitoring ηma and the post-gradual change target efficiency ηmb is used in the calculation of the target torque for monitoring Tma, the value of the target torque for monitoring Tma is increased. With this, in the case where the target efficiency ηm is unusually decreased, the torque deviation ΔTm becomes larger than the first threshold value ΔTm1 more reliably, and it is possible to detect the abnormality in which the target efficiency ηm is unusually decreased and the excessive torque is output.

Note that, even in a case where the decrease in the target efficiency for monitoring ηma becomes almost equal to the decrease in the target efficiency ηm when the target efficiency ηm is unusually decreased, e.g., in a case where the misfire limit is set sufficiently on the retard angle side such that the target torque Tm can be achieved with the target ignition timing SAm even when the target efficiency ηm is unusually decreased or the misfire limit is not set, the decrease in the post-gradual change target efficiency ηmb becomes smaller than the decrease in the target efficiency ηm. As a result, also in this case, as described above, it is possible to detect the abnormality in which the target efficiency ηm is unusually decreased and the excessive torque is output by using the larger one of the target efficiency for monitoring ηma and the post-gradual change target efficiency ηmb (i.e., the post-gradual change target efficiency ηmb in this case) in the calculation of the target torque for monitoring Tma.

Although the preferred embodiments of the invention has been described with reference to the accompanying drawings thus far, the invention is not limited to the embodiments described above. It is clear that a person skilled in the art can conceive of various variation examples or modification examples, without departing from the scope of the invention set forth in the claims, and these variation examples and modification examples are obviously construed to belong to the technical scope of the invention.

The invention is suitably applied to an abnormality detection device that detects the abnormality of an engine control device that controls an engine mounted on, e.g., a vehicle, i.e., the abnormality in which a torque more excessive than a torque intended to be output by a driver is output.

The invention claimed is:

1. An abnormality detection device for an engine control device configured to calculate a first target torque, the engine control device being configured to calculate a first target efficiency, the engine control device being configured to calculate a target load factor based on the first target torque, the engine control device being configured to convert the target load factor to a target throttle opening, the engine control device being configured to calculate a target ignition timing based on the first target efficiency, and the engine control device being configured to control an engine based on the target throttle opening and the target ignition timing, the abnormality detection device comprising:
 a controller configured to calculate a target efficiency for monitoring an abnormality based on the target ignition timing,
 the controller being configured to calculate a target torque for monitoring the abnormality based on the target efficiency for monitoring the abnormality and the target load factor,
 the controller being configured to calculate a torque deviation between the target torque for monitoring the abnormality and the first target torque,
 the controller being configured to count the number of times the torque deviation exceeds a first threshold value that is a threshold value chosen to make it possible to detect the abnormality in which the first target efficiency is unusually decreased and excessive torque is output,
 the controller being configured to determine that the engine control device has the abnormality when the number of times the torque deviation exceeds the first threshold value exceeds a second threshold value, and
 the controller being configured to output the determination of the abnormality so that the engine control device sets a control amount of at least one actuator used in engine control to prevent the output of the excessive torque.

2. The abnormality detection device according to claim 1, wherein
 the controller calculates a post-gradual change target efficiency by performing gradual change processing on the first target efficiency, wherein, as the gradual change processing, when the first target efficiency is larger than the first target efficiency acquired in previous processing, a predetermined gradual change amount is added to the previous first target efficiency, whereas, when the first target efficiency is smaller than the first target efficiency acquired in previous processing, the predetermined gradual change amount is subtracted from the previous first target efficiency, and wherein the controller calculates the target torque for monitoring the abnormality based on the larger one of the target efficiency for monitoring the abnormality and the post-gradual change target efficiency, and the target load factor.

3. The abnormality detection device according to claim 2, wherein
 when the post-gradual change target efficiency is smaller than the post-gradual change target efficiency acquired in previous processing, the controller calculates the post-gradual change target efficiency by subtracting the predetermined gradual change amount from the post-gradual change target efficiency acquired in the previous processing.

4. An abnormality detection device for an engine control device configured to calculate a first target torque, the engine control device being configured to calculate a first target efficiency, the engine control device being configured to calculate a target load factor based on the first target torque, the engine control device being configured to convert the target load factor to a target throttle opening, the engine control device being configured to calculate a target ignition timing based on the first target efficiency, and the engine control device being configured to control an engine based on the target throttle opening and the target ignition timing, the abnormality detection device comprising:
 a controller configured to calculate a post-gradual change target efficiency by performing gradual change processing on the first target efficiency, wherein, as the gradual change processing, when the first target efficiency is larger than the first target efficiency acquired in previous processing, a predetermined gradual change amount is added to the previous first target efficiency, whereas, when the first target efficiency is smaller than the first target efficiency acquired in previous processing, the predetermined gradual change amount is subtracted from the previous first target efficiency,
 the controller being configured to calculate a target torque for monitoring an abnormality based on the post-gradual change target efficiency and the target load factor,
 the controller being configured to calculate a torque deviation between the target torque for monitoring the abnormality and the first target torque,
 the controller being configured to count the number of times the torque deviation exceeds a first threshold value that is a threshold value chosen to make it possible to detect the abnormality in which the first target efficiency is unusually decreased and excessive torque is output,
 the controller being configured to determine that the engine control device has the abnormality when the number of times the torque deviation exceeds the first threshold value exceeds a second threshold value, and
 the controller being configured to output the determination of the abnormality so that the engine control device sets a control amount of at least one actuator used in engine control to prevent the output of the excessive torque.

5. The abnormality detection device according to claim 4, wherein
 the controller calculates a target efficiency for monitoring the abnormality based on the target ignition timing, and the controller calculates the target torque for monitoring the abnormality based on the larger one of the target efficiency for monitoring the abnormality and the post-gradual change target efficiency, and the target load factor.

6. The abnormality detection device according to claim 4, wherein
 when the post-gradual change target efficiency is smaller than the post-gradual change target efficiency acquired in previous processing, the controller calculates the post-gradual change target efficiency by subtracting the predetermined gradual change amount from the post-gradual change target efficiency acquired in the previous processing.

7. An abnormality detection method for an engine control device configured to calculate a first target torque, the engine control device being configured to calculate a first target efficiency, the engine control device being configured to calculate a target load factor based on the first target torque, the engine control device being configured to convert the target load factor to a target throttle opening, the engine control device being configured to calculate a target ignition timing based on the first target efficiency, and the engine control device being configured to control an engine based on the target throttle opening and the target ignition timing, the abnormality detection method comprising:

calculating, with a controller of an abnormality detection device, a target efficiency for monitoring an abnormality based on the target ignition timing, calculating, with the controller, a target torque for monitoring the abnormality based on the target efficiency for monitoring the abnormality and the target load factor;

calculating, with the controller, a torque deviation between the target torque for monitoring the abnormality and the first target torque;

counting, with the controller, the number of times the torque deviation exceeds a first threshold value that is a threshold value chosen to make it possible to detect the abnormality in which the first target efficiency is unusually decreased and excessive torque is output;

determining, with the controller, that the engine control device has the abnormality when the number of times the torque deviation exceeds the first threshold value exceeds a second threshold value; and outputting the determination of the abnormality by the controller so that the engine control device sets a control amount of at least one actuator used in engine control to prevent the output of the excessive torque.

8. An abnormality detection method for an engine control device configured to calculate a first target torque, the engine control device being configured to calculate a first target efficiency, the engine control device being configured to calculate a target load factor based on the first target torque, the engine control device being configured to convert the target load factor to a target throttle opening, the engine control device being configured to calculate a target ignition timing based on the first target efficiency, and the engine control device being configured to control an engine based on the target throttle opening and the target ignition timing, the abnormality detection method comprising:

calculating, with a controller of an abnormality detection device, a post-gradual change target efficiency by performing gradual change processing on the first target efficiency, wherein, as the gradual change processing, when the first target efficiency is larger than the first target efficiency acquired in previous processing, a predetermined gradual change amount is added to the previous first target efficiency, whereas, when the first target efficiency is smaller than the first target efficiency acquired in previous processing, the predetermined gradual change amount is subtracted from the previous first target efficiency;

calculating, with the controller, a target torque for monitoring an abnormality based on the post-gradual change target efficiency and the target load factor;

calculating, with the controller, a torque deviation between the target torque for monitoring the abnormality and the first target torque;

counting, with the controller, the number of times the torque deviation exceeds a first threshold value that is a threshold value chosen to make it possible to detect the abnormality in which the first target efficiency is unusually decreased and excessive torque is output;

determining, with the controller, that the engine control device has the abnormality when the number of times the torque deviation exceeds the first threshold value exceeds a second threshold value; and outputting the determination of the abnormality by the controller so that the engine control device sets a control amount of at least one actuator used in engine control to prevent the output of the excessive torque.

9. The abnormality detection device according to claim 1, wherein the first target efficiency is a target of an efficiency that is defined by a ratio of an output torque and a torque of the engine at a minimum spark advance for best torque (MBT) ignition timing.

10. The abnormality detection device according to claim 4, wherein the first target efficiency is a target of an efficiency that is defined by a ratio of an output torque and a torque of the engine at a minimum spark advance for best torque (MBT) ignition timing.

11. The abnormality detection method according to claim 7, wherein the first target efficiency is a target of an efficiency that is defined by a ratio of an output torque and a torque of the engine at a minimum spark advance for best torque (MBT) ignition timing.

12. The abnormality detection method according to claim 8, wherein the first target efficiency is a target of an efficiency that is defined by a ratio of an output torque and a torque of the engine at a minimum spark advance for best torque (MBT) ignition timing.

* * * * *